Jan. 23, 1962     J. C. CARROLL ET AL     3,018,382

FREQUENCY DETECTOR

Filed July 30, 1959

WITNESSES

INVENTORS
James C. Carroll &
Francis T. Thompson
BY
ATTORNEY () # United States Patent Office 3,018,382
Patented Jan. 23, 1962

3,018,382
FREQUENCY DETECTOR
James C. Carroll, North Huntingdon Township, Westmoreland County, and Francis T. Thompson, Penn Hills, Pa., assignors to Westinghouse Electric Corporation, East Pittsburgh, Pa., a corporation of Pennsylvania
Filed July 30, 1959, Ser. No. 830,525
3 Claims. (Cl. 307—88)

This invention relates to feedback control systems and more particularly to devices providing an output voltage proportional to the frequency of its input signal.

In any closed loop speed control system, it is necessary to generate a feedback signal that is proportional to the speed of the shaft to be controlled. The accuracy of the feedback signal then determines the ccuracy of the speed control system. Saturating transformers provide an accurate means of obtaining an output voltage that is proportional to its input frequency. This proportionality is due to the fact the volt-second area for each input half cycle is a constant provided the core is driven fully into saturation.

It is a broad object of this invention to provide a feedback control circuit that will accurately convert a frequency input to a voltage output.

A more specific object of this invention is to provide a very efficient voltage to frequency converter using saturating transformers.

A more specific object of this invention is to provide a very accurate frequency to voltage converter using saturating transformers.

The objects cited are merely illustrative. Other objects and advantages will become more apparent from a study of the following specification and the accompanying drawing, in which.

Figure 1:
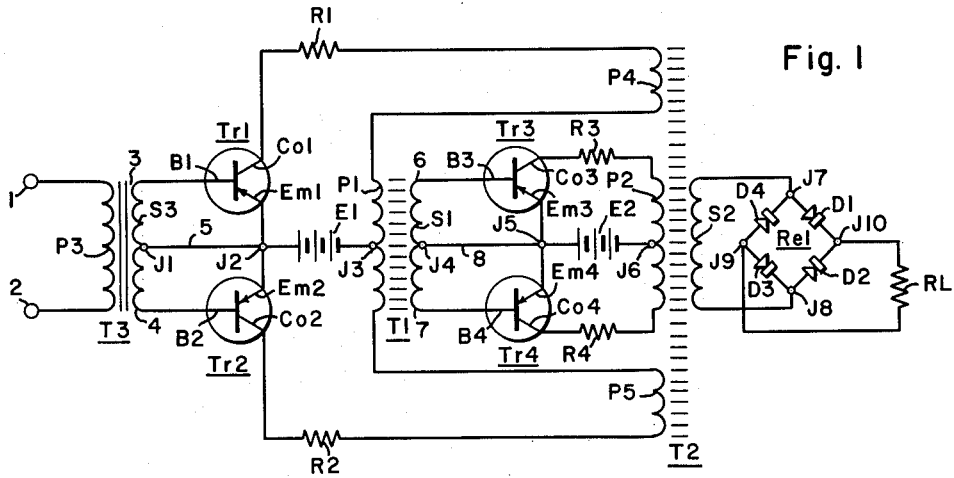
FIGURE 1 is a diagrammatic showing of an embodiment of this invention.

In FIGURE 1, a signal having a pulse repetition rate proportional to the frequency to be detected is applied across the primary winding P3 from terminals 1 and 2. The secondary winding S3 of transformer T3, center tapped at junction 1, is provided to drive the transistors T$r$1 and T$r$2 in push-pull manner. The outer terminals 3 and 4, of the secondary winding of transformers T3, are connected, respectively to the bases B1 and B2. The emitters E$m$1 and E$m$2 are connected to each other at junction J2 on the conductor 5, which conductor is connected between junction J1 and the positive terminal of the battery E1. The collector C$o$1 is connected in a loop circuit including the resistor R1, the winding P4 on the core of the saturating transformer T2, the upper half of the primary winding P1 of saturating transformer T1, the junction J3 at the center of primary winding P1, through the battery E1 from the negative terminal to the positive terminal to junction J2 and thus the emitter E$m$1. The collector C$o$2 is similarly connected in a loop circuit including, the resistor R2, the winding P5 on the core of saturating transformer T2, the lower half of the primary winding P1 of saturating transformer T1, junction J3, through the battery E1 from the negative to the positive terminal to junction J2 and thus the emitter E$m$2.

The center tapped secondary S1 of saturable transformer T1 is used to drive transistors T$r$3 and T$r$4 in a push-pull manner. The outer terminals 6 and 7, of the secondary winding S1 of saturable transformer T1 are connected, respectively, to the bases B3 and B4 of transistors T$r$3 and T$r$4. The emitters E$m$3 and E$m$4 are connected to each other at junction J5 on the conductor 8, which conductor is connected between junction J4 and the positive terminal of the battery E2. The collector C$o$3 is connected in a loop circuit including the resistor R3, the upper half of primary winding P2 of the saturating transformer T2, the junction J6 at the center of the primary winding P2, through the battery E2 from the negative terminal to the positive terminal to junction J5 and thus the emitter E$m$3. The collector C$o$4 is similarly connected in a loop circuit including, the resistor R4, the lower half of the primary winding P2, the junction J6, through the battery E2 from the negative terminal to the positive terminal to junction J5 and thus the emitter E$m$4. The secondary winding S2 of saturable transformer T2 is placed across a full-wave rectifier, at junctions J7 and J8. The full-wave rectifier includes diodes D1, D2, D3 and D4. The load RL is connected across the direct current junction J9 and J10 of the full-wave rectifier Re1.

In conventional known circuitry, transformer T1 does not saturate at operating frequencies and windings P4 and P5 of transformer T2 are omitted. Resistors R1 and R2 would be connected directly to opposite ends of winding P1 on transformer T1. During one half cycle of the input voltage applied across terminals 1 and 2, transistors T$r$1 and T$r$3 conduct while transistors T$r$2 and T$r$4 are nonconducting. During the first portion of this half cycle, time $t$1 to $t$3 shown in FIGURE 2, the flux in transformer T2 changes from $-B_m$ to $B_m$ producing a fixed volt-second area across winding S2 of transformer T2. The conversion from frequency to voltage is highly accurate, but the circuit is inefficient. From time $t$3 to the end of the half cycle of input voltage the flux remains at $B_m$ and no voltage is induced across P2 or S2. A high current limited only by R3 flows through transistor T$r$3 resulting in high power dissipation.

Figure 3:
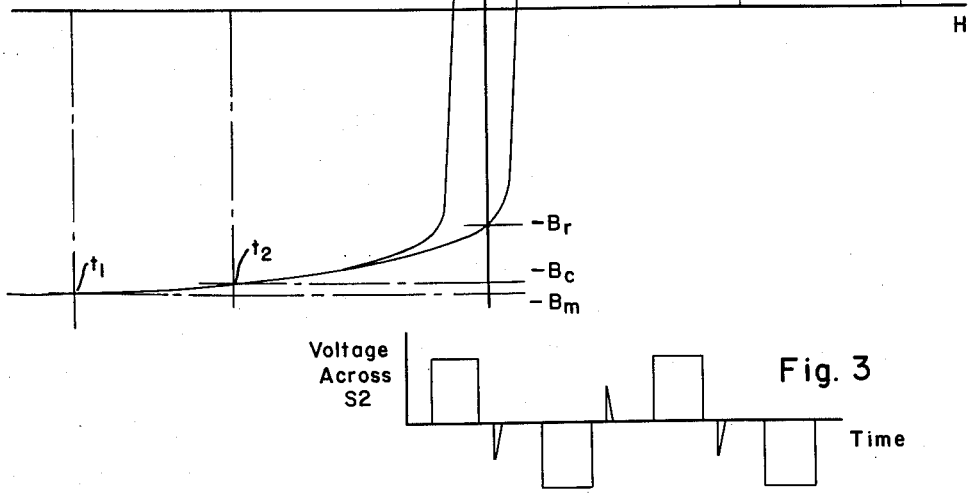
FIGURE 3 is a plot of the voltage output of the circuitry shown in FIGURE 1, when the primary windings P4 and P5 are inoperative.

A method of increasing the efficiency of the circuit by reducing the interval of time during which the high current flows is described in a copending application of (James C. Carroll et al., Serial No. 801,659, filed March 24, 1959 and entitled Wide Range High Output Frequency Detector). Using this method transformer T1 would saturate at a slightly lower frequency than transformer T2. Windings P4 and P5 were not included. During the first portion of the half cycle of input voltage, from time $t$1 to time $t$3 operation is the same as previously described. Slightly after time $t$3 transformer T1 saturates, which removes the bias from transistor T$r$3 causing it to stop conducting. The flux density in transformer T2 drops to the remnant flux density $B_r$. In FIGURE 3 the large square pulse, which represents the desired output, occurs during the time from $t$1 to $t$3. The small spurious pulse, which reduces the accuracy of the frequency to voltage conversion, is caused by the change in flux from $B_m$ to $B_r$. The amplitude of this pulse is reduced by rectifier drop.

The addition of windings P4 and P5 on transformer T2 greatly reduces this spurious pulse. The resultant circuit of FIGURE 1 combines the accuracy of the conventional circuit with the efficiency of the circuit of the hereinabove mentioned copending application.

Figure 2:
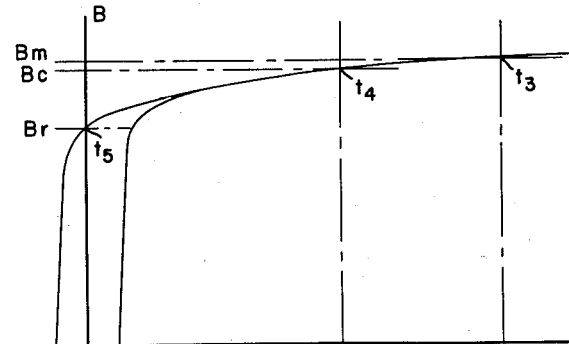
FIGURE 2 is a sketch of the B—H loop for the saturable core transformer T2 of FIG. 1.

The operation of the circuit shown in FIGURE 1 is as follows. Saturating transformer T2 is designed to saturate at the highest frequency encountered by the circuit and will provide the required output voltage. Saturable transformer T1 is designed to saturate at a slightly lower frequency. As the transistors are connected in push-pull manner only the positive half cycle will be described. The input signal at contactors 1 and 2 has a pulse repetition rate proportional to the frequency to be detected. The input signal provides an input to transistor T$r$1 through the secondary winding S3 to cause transistor Tr1 to become conductive, that is to fire. The current through the primary winding P1 of saturating transformer T1 provides an input through the secondary winding of saturating transformer T1, to the transistor Tr3 to cause it to fire. This means a current flows in the loop circuit including collector Co1, and a current flows in the loop circuit including Co3. The cores of the saturating transformers T1 and T2 then begin to saturate. The time designations, $t1$, $t2$, $t3$, etc., on FIG. 2 represent time on the input cycle. When the core of saturable transformer T2 saturates, $t3$ in FIGURE 2, the output from the secondary winding of saturable transformer T2 is cut off and a high current flows through the circuit transistor Tr3. However, a short time later the core of saturable transformer T1 saturates, which removes the bias from transistor Tr3 causing it to stop conducting. Because the core of saturable transformer T1 is saturated, a high current flows in the circuit of transistor Tr1. The compensating winding P4 on the core of saturable transformer T2 provides magnetizing current to saturable transformer T2, or a large current flows in the circuit of transistor Tr1 once the core of saturable transformer T1 saturates. Thus the magnetomotive force provided by the compensating winding P4 only allows the core of saturable transformer to demagnetize to $Bc$, at time $t4$ on FIG. 2. At the end of the positive half cycle, the input is taken from the transistor Tr1 and it stops conducting. The positive half cycle of the push-pull operation is now inoperative until the next positive input signal. A negative input signal causes the negative half of the push-pull circuit to operate as described above for the positive input, except the saturable transformers are driven into negative saturation.

For particular applications, it would be possible to drive the first saturable transformer directly from the output of the signal generator.

If compensating windings P4 and P5 were inoperative in FIGURE 1, an output voltage as shown in FIGURE 3 would be obtained. The error voltage $Ec$ as shown in FIGURE 3, is proportional to $Bm-Br$, see FIG. 2. By using the compensating windings, this error voltage can be greatly reduced, as the core of saturable transformer T3 is prevented from demagnetizing to remnant flux density $Br$ by the current in the compensating windings. So the error voltage $Ec$ is now proportional to $Bm-Bc$. Thus the use of compensating windings results in an increased accuracy over previous circuits in obtaining an output voltage that is directly proportional to an input frequency.

While but one embodiment has been shown and described, it is apparent that the invention is not limited to the particular showing made but is susceptible of modification and change falling well within the scope of the invention.

The claims are:

1. In control circuitry, in combination, generating means, including a transformer having primary windings and secondary windings, to provide a signal whose pulse repetition rate is proportional to the frequency to be detected, a first transistor power amplifier which is driven by the output from the secondary winding of said transformer; a first saturating transformer having primary windings and secondary windings and whose primary windings receive the output of said first transistor power amplifier; a second transistor power amplifier which receives the output from the secondary windings of said first saturable transformer; a second saturable transformer having primary windings and secondary windings and whose primary winding receives the output of said second transistor power amplifier and whose core has additional windings so arranged as to be energized by said generating means which energizes the first saturable transformer; and a siutable load circuit to receive the output from the secondary winding of said second saturable transformer.

2. In control circuitry, in combination, generating means to provide a signal whose pulse repetition rate is proportional to the frequency to be detected; a first saturable transformer; a transistor power amplifier; a second saturable transformer designed to saturate at a slightly higher frequency than the first saturable transformer; in series with said generating means is included a first resistor, a first compensating winding on the core of said second saturable transformer, the primary winding of said first saturable transformer, a second compensating winding on the core of said second saturable transformer, and a second resistor; said first saturable transformer has a center tapped secondary winding which is used to drive said transistor power amplifier; said transistor power amplifier includes two transistors connected in a push-pull manner, the outer terminals of the secondary coil of said first saturable transformer core are connected to the base terminals of said transistors, the center tap on the secondary winding of said first saturable transistor is connected to the emitter terminals which are common for said transistors at a first junction, the collector terminals of said transistors are connected with a series circuit including a third resistor, the center tapped primary winding of said second saturable transformer, and a fourth resistor; between the center tap on the primary winding of said second saturable transformer and said first junction is connected a direct-current source with its positive terminal common with said first junction; and a suitable load circuit to receive the output from the secondary winding of said second saturable transformer.

3. A feedback control circuit, in combination, generating means to provide a signal whose pulse repetition rate is proportional to the frequency to be detected; a transformer to receive the output of said generating means across its primary winding; a first transistor power amplifier driven by the output from the center tapped secondary winding of said transformer; a first saturable transformer; a second transistor power amplifier; a second saturable transformer whose core is designed to saturate at a slightly higher frequency than the core of said first saturable transformer; the said first transistor power amplifier includes two transistors connected in a push-pull manner, the outer terminals of the secondary winding of said transformer are connected to the base terminals of said transistors, the center tap on the secondary winding of said transformer is connected to the emitter terminals which are common on the said transistors at a first junction; the collector terminals of said transistors are connected with a first series circuit including a first resistor, a first compensating winding on the core of said second saturable transformer, the primary winding, which is center tapped, of said first saturable transformer, a second compensating winding on the core of said second saturable transformer, and a second resistor; between the center tap on the primary winding of said first saturable transformer and said first junction is connected a first direct-current source with its positive terminal common with said first junction, the said second transistor power transformer is driven from the center tapped secondary winding of said first saturable transformer, said second transistor power amplifier includes two transistors connected in a push-pull manner, the outer terminal of the secondary winding of said first saturable transformer are connected to the base terminals of the said transistors of the second transistor power amplifier; the center tap on the secondary winding of the said first saturable transformer is connected to the emitter terminals which are common at a second junction for the said transistors of said second transistor power amplifier, the collector terminals of said transistors of said second transistor power amplifier are connected with a second series circuit including a third resistor, the primary winding, which is center tapped, of said second saturable transformer, and a fourth resistor, between the center tap on the primary of said second saturable transformer and said second junction is placed a second direct-current source with its positive terminal common with said second junction, and a suitable load circuit to receive the output from the secondary winding of said second saturable transformer.

References Cited in the file of this patent

UNITED STATES PATENTS

| | | |
|---|---|---|
| 2,785,236 | Bright | Mar. 12, 1957 |
| 2,853,559 | Leonard | Sept. 23, 1958 |
| 2,866,178 | Lo | Dec. 23, 1958 |